US012762269B2

(12) United States Patent
Dixit et al.

(10) Patent No.: US 12,762,269 B2
(45) Date of Patent: Oct. 13, 2026

(54) SENSITIVE DATA CLASSIFICATION FOR MICRO-SERVICE APPLICATIONS

(71) Applicant: CONCENTRIC SOFTWARE, INC., San Mateo, CA (US)

(72) Inventors: Advait Abhay Dixit, Sunnyvale, CA (US); Udayakumar Srinivasan, Fremont, CA (US); Dhruv Hemchand Jain, Santa Clara, CA (US); Sarangan Rangachari, Saratoga, CA (US); Abhishek Das, San Francisco, CA (US)

(73) Assignee: CONCENTRIC SOFTWARE, INC., San Mateo, CA (US)

( * ) Notice: Subject to any disclaimer, the term of this patent is extended or adjusted under 35 U.S.C. 154(b) by 451 days.

(21) Appl. No.: 18/151,746

(22) Filed: Jan. 9, 2023

(65) Prior Publication Data

US 2024/0232419 A1 Jul. 11, 2024

(51) Int. Cl.
*G06F 21/62* (2013.01)
*G06F 16/906* (2019.01)

(52) U.S. Cl.
CPC ........ *G06F 21/6227* (2013.01); *G06F 16/906* (2019.01)

(58) Field of Classification Search
CPC . G06F 21/6227; G06F 16/906; G06F 21/6245
See application file for complete search history.

(56) References Cited

U.S. PATENT DOCUMENTS

| | | | |
|---|---|---|---|
| 7,526,550 | B2 | 4/2009 | Frey et al. |
| 9,697,104 | B2 | 7/2017 | Obermiller et al. |
| 10,114,559 | B2 | 10/2018 | Erdmann et al. |

(Continued)

FOREIGN PATENT DOCUMENTS

CN 110149397 A 8/2019

OTHER PUBLICATIONS

Averdunk, Ingo, "Implement distributed tracing in your microservices-based app," www.ibm.com/garage/method/practices/code/distributed-tracing, May 8, 2022, 3 pages.

(Continued)

*Primary Examiner* — Blake I Narramore
(74) *Attorney, Agent, or Firm* — EVERGREEN VALLEY LAW GROUP; Kanika Radhakrishnan

(57) ABSTRACT

A datastore layer service of a plurality of services that compose an application receives, from an upstream service of the plurality of services, a request, the request being associated with a transaction submitted to the application, the request including a transaction identifier that uniquely identifies the transaction. The datastore layer service, in response to the request, initiates a query against a datastore to obtain a data item based on information included in the request. A sensitive data classifier analyzes query information associated with the query. The sensitive data classifier determines that the query requests a data item that has been classified as a sensitive data item. The sensitive data classifier causes the transaction identifier and classification information that indicates the query requested the data item that has been classified as a sensitive data item to be sent to a collector service.

21 Claims, 8 Drawing Sheets

(56) References Cited

U.S. PATENT DOCUMENTS

| | | | | |
|---|---|---|---|---|
| 2006/0026042 | A1* | 2/2006 | Awaraji | G06F 21/6245 707/999.009 |
| 2016/0148212 | A1* | 5/2016 | Dimmick | G06Q 20/4014 705/44 |
| 2018/0060593 | A1* | 3/2018 | Abraham | G06F 16/9535 |
| 2021/0150057 | A1* | 5/2021 | Scuderi | G06F 16/248 |
| 2021/0209159 | A1* | 7/2021 | Mahanta | G06N 20/00 |
| 2022/0255764 | A1* | 8/2022 | Li | G06F 21/606 |
| 2023/0015523 | A1* | 1/2023 | Mani | G06Q 20/383 |
| 2023/0153454 | A1* | 5/2023 | Lee | G06F 21/6227 713/189 |
| 2023/0237180 | A1* | 7/2023 | Scott | G06F 9/451 726/28 |
| 2023/0315872 | A1* | 10/2023 | Lally | H04L 9/3239 726/27 |
| 2024/0126916 | A1* | 4/2024 | Nguyen | G06F 21/602 |
| 2024/0195603 | A1* | 6/2024 | Wang | H04L 9/008 |

OTHER PUBLICATIONS

Barabanov, et al., "Security Audit Logging in Microservice-Based Systems: Survey of Architecture Patterns," arXiv:2102.09435, Feb. 2021, 12 pages.

Cinque et al., "Microservices Monitoring with Event Logs and Black Box Execution Tracing," IIEEE Transactions on Services Computing, vol. 15, No. 1, doi: 10.1109/TSC.2019.2940009, Jan. 2022, pp. 294-307.

Newman, Andre, "Why Transaction Tracing is Critical for Monitoring Microservices," www.loggly.com/blog/why-transaction-tracing-is-critical-for-monitoring-microservices, Jan. 20, 2020, 5 pages.

* cited by examiner

22

[Header].{
"aud"· "416684a7-0b52-4fa3-9918-e76d16542be2",
77{ "iss": "https://login.microsoftonline.com/c72ad-d7aS/v 2.0",
"iat" 1563883336,
"nbf": 1563883336,
"exp": 1563887236,
"aio":"ATQAy/8MAAAAaltA/3Modx+ON+QMi502ot5rFp5j",
"azp"· "bb 764c21-49b8-49de-aa24-6c76d7dc800f",
"azpacr": "0",
79{ "name": "Bob Jones",
"oid": "0e748cd0-5d2a-4918-a351-9549e75fd1dd",
83{ "preferred_username": BobJ@microsoftidentity.dev", "rh": "I",
"roles":["Admin"],
"scp": "Catalog.View.All Catalog.View.Published",
"sub": "0X7PvET4orHRnRYnd MvA4CYIYxg_CowsE1BGTIAK6hE",
"tid": "c72a295d-d7a5-41ea-a351-b15dd9f67215",
"uti": "kaeFCRGwm0SOwMNnjvlHAA",
"ver": "2.0"
81{ }.[Signature]

FIG. 3

SENSITIVE DATA CLASSIFICATION FOR MICRO-SERVICE APPLICATIONS

BACKGROUND

The trend to develop applications as a collection of interrelated services offers many advantages, including increased scalability, easier maintenance, reuse of services in disparate applications, and the like.

SUMMARY

The embodiments disclosed herein implement sensitive data classification for micro-service applications.

In one embodiment a method is provided. The method includes receiving, by a datastore layer service of a plurality of services that compose an application from an upstream service of the plurality of services, a request, the request being associated with a transaction submitted to the application, the request including a transaction identifier that uniquely identifies the transaction. The method further includes initiating, by the datastore layer service in response to the request, a query against a datastore to obtain a data item based on information included in the request. The method further includes analyzing, by a sensitive data classifier, query information associated with the query. The method further includes determining, by the sensitive data classifier, that the query requests a data item that has been classified as a sensitive data item. The method further includes causing, by the sensitive data classifier, the transaction identifier and classification information that indicates the query requested the data item that has been classified as a sensitive data item to be sent to a collector service.

In another embodiment a computing system is provided. The computing system includes one or more processor devices of one or more computing devices. The one or more processor devices are configured to receive, by a datastore layer service of a plurality of services that compose an application from an upstream service of the plurality of services, a request, the request being associated with a transaction submitted to the application, the request including a transaction identifier that uniquely identifies the transaction. The one or more processor devices are configured to initiate, by the datastore layer service in response to the request, a query against a datastore to obtain a data item based on information included in the request. The one or more processor devices are configured to analyze, by a sensitive data classifier, query information associated with the query. The one or more processor devices are configured to determine, by the sensitive data classifier, that the query requests a data item that has been classified as a sensitive data item. The one or more processor devices are configured to cause, by the sensitive data classifier, the transaction identifier and classification information that indicates the query requested the data item that has been classified as a sensitive data item to be sent to a collector service.

In another embodiment a non-transitory computer-readable storage medium is provided. The non-transitory computer-readable storage medium includes executable instructions configured to cause one or more processor devices to receive, by a datastore layer service of a plurality of services that compose an application from an upstream service of the plurality of services, a request, the request being associated with a transaction submitted to the application, the request including a transaction identifier that uniquely identifies the transaction. The executable instructions are further configured to cause the one or more processor devices to initiate, by the datastore layer service in response to the request, a query against a datastore to obtain a data item based on information included in the request. The executable instructions are further configured to cause the one or more processor devices to analyze, by a sensitive data classifier, query information associated with the query. The executable instructions are further configured to cause the one or more processor devices to determine, by the sensitive data classifier, that the query requests a data item that has been classified as a sensitive data item. The executable instructions are further configured to cause the one or more processor devices to cause, by the sensitive data classifier, the transaction identifier and classification information that indicates the query requested the data item that has been classified as a sensitive data item to be sent to a collector service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 illustrates a security token according to one embodiment;

DETAILED DESCRIPTION

Figure 1A:
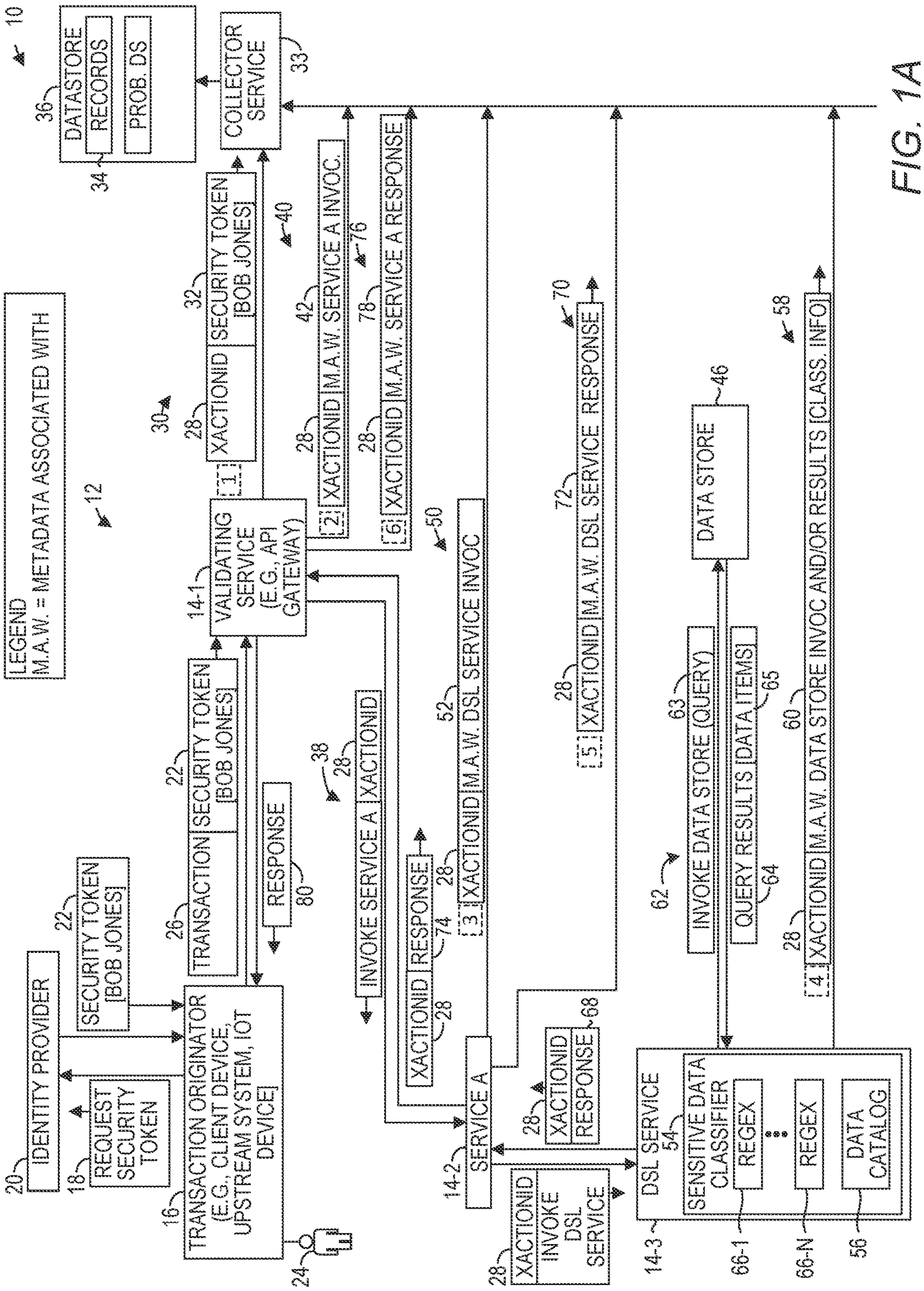
FIGS. 1A-1B are block diagrams of an environment suitable for implementing sensitive data classification for micro-service applications according to one embodiment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Software applications are increasingly implemented as a collection of individual services. Thus, rather than execute on a computing device as a single process as may have occurred in the past, today a software application is likely to be implemented via a plurality of individual services that may even run on different computing hosts. Each service may execute as a separate process or group of processes. The services typically communicate with one another through a messaging infrastructure, such as queues, a service mesh (e.g., Istio.io), a RESTful Application Programming Interface (API), or the like. This may sometimes be referred to as a micro-service architecture.

There are many advantages to a micro-service architecture approach to application development, such as ease of maintenance, ability to use certain services in different applications with little or no modifications, an ability to spread services across different computing devices for load balancing purposes, and the ability to scale at a service level. A micro-service architecture may be implemented via any number of different technologies including, by way of non-limiting example, cloud-native technologies such as containers and serverless functions.

As security has become increasingly important, it is now common for an application to require electronic credentials, such as a security token, that identify and authorize a transaction originator of a transaction prior to processing the transaction. Such tokens may be obtained by an originator from an identity provider, such as Microsoft, Okta, or the like, who validates an originator's identity and generates a security token that is signed by the identity provider. The entry point into the application, such as a validating service, may receive the security token, ensure that the signature of the identity provider is correct, and then begin processing the transaction in accordance with the privileges identified in the security token.

It is common that, once the transaction has been accepted, the security token is not passed along from service to service because there is typically no reason to do so since it has been determined that the transaction has been authorized to be processed by the application.

One or more services that compose the application may invoke (e.g., access) a datastore, such as, by way of non-limiting example, a database, a data file, or any other data-containing structure. Services may send sensitive data to, and/or receive sensitive data from, such datastores. Such sensitive data may include, by way of non-limiting example, names, addresses, credit card numbers, driver's license identifiers, social security numbers, and the like. Unfortunately, even if it is determined that such sensitive data has been received or sent by a service, it can be difficult or impossible to correlate the sensitive data with a particular transaction, or with an originator of the transaction. It can also be difficult or impossible to determine whether a service accessed sensitive data.

The embodiments disclosed herein implement sensitive data classification for micro-service applications. In particular, a datastore layer (DSL) service of an application that comprises a plurality of different services receives a request from an upstream service. The request is associated with a transaction submitted to the application and includes a transaction identifier that uniquely identifies the transaction. The DSL service initiates a query against a datastore to obtain a data item based on the request. A sensitive data classifier determines that the query requests a data item that has been classified as a sensitive data item. The sensitive data classifier sends a message that includes the transaction identifier and classification information that indicates the query requested the data item that has been classified as a sensitive data item to a collector service. In this manner, it can be determined which services of a plurality of services that compose the application have requested sensitive data items, and which transactions caused such services to request sensitive data items.

The collector service receives messages from the services and stores records based on the transaction identifier and the metadata about the information. Over a period of time, the collector service may receive thousands, hundreds of thousands, or millions of such messages and store thousands, hundreds of thousands, or millions of records.

A sensitive data visualizer may access the records and identify transactions that involved sensitive data, the service or services that sent or received sensitive data, and the originators of such transactions.

Figure 1B:
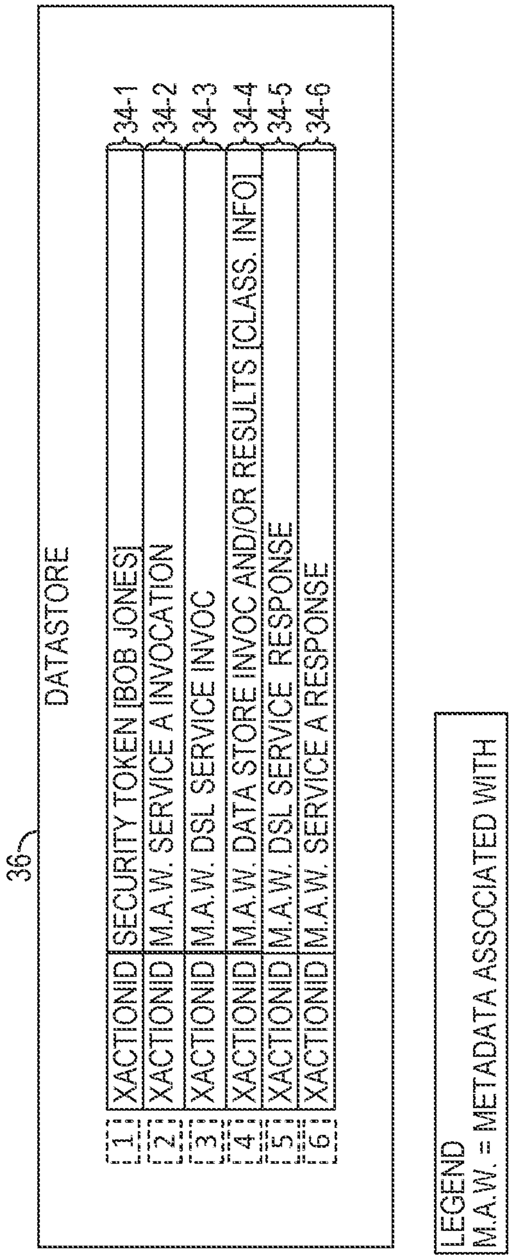

FIGS. 1A-1B are block diagrams of an environment 10 suitable for implementing sensitive data classification for micro-service applications according to one embodiment. The environment 10 includes an application 12 that is composed of a plurality of micro-services 14-1-14-3 (herein generally, services 14). The term "micro" in the phrase "micro-service" refers to the fact that the application comprises multiple different services, and does not imply a particular programming language or application architecture. Collectively, the services 14 compose the application 12. In some implementations, the application 12 comprises a cloud-native application, and the services 14 may comprise, for example, serverless functions, or containers that communicate with one another via one or more networks. In some embodiments, the services 14 may run in a container orchestration system, such as Kubernetes, and may comprise pods. While not illustrated due to space limitations, each of the services 14 execute on computing devices that include memory and one or more processor devices. The services 14 may execute on the same computing device, or may execute on multiple computing devices. In a cloud computing environment, the services 14 may be distributed over any number of computing devices. While only three services 14 are illustrated for purposes of explanation and simplicity, in practice, the application 12 may comprise tens or hundreds of services 14.

The services 14 communicate with one another using any desired inter-process communication (IPC) mechanism, such as, by way of non-limiting examples, one or more of message queues, files, a RESTful API, service mesh IPC mechanisms, or the like. Although in the embodiments discussed herein the application 12 provides an online website functionality, the embodiments are not limited to any particular application functionality and have applicability to any application comprising a micro-service architecture.

The application 12 includes one or more validating services 14-1 which receive transactions from transaction originators. The validating service 14-1, in this example, is a gateway API validating service into the application 12, but in other implementations, the validating service 14-1 may not be a gateway API service. Moreover, while for purposes of convenience the validating service 14-1 is illustrated as a single service 14, in other implementations, multiple services 14 may operate to provide the functionality attributed herein to the validating service 14-1. The application 12 may be configured to deny any transaction that is not first provided to the validating service 14-1. The validating service 14-1, prior to allowing the application 12 to process a transaction, may validate that the entity submitting the transaction has the authority to do so.

In this example, a transaction originator 16 initially sends a request 18 to an identity provider 20 to obtain a security token 22. The transaction originator 16 may, by way of non-limiting example, be a client device that sends the request 18 in response to input from a user 24. Alternatively, the application 12 may be an application that is downstream of some upstream application, and the transaction originator 16 may be a service of another application. In another implementation, the transaction originator 16 may be a standalone device, such as an Internet-of-Things (IoT) device, or the like.

The identity provider 20 is operated by a trusted entity, such as Microsoft, Okta, or the like, that validates (or does not validate) a transaction originator's request for a security token. The validation may depend on whatever criteria the identity provider 20 requires, such as valid authentication credentials, or the like. In this example, assume that the request 18 contains appropriate authentication information, such as a user identifier and password of an entity, such as the user 24, and the identity provider 20 determines that the transaction originator 16 is authorized to access the application 12. Based on the authentication information, the identity provider 20 generates a message (referred to herein as the security token 22) that indicates that the transaction originator 16 is authorized to access the application 12 and sends the security token 22 to the transaction originator 16. The security token 22 contains information associated with the transaction originator 16, such as an identity of the entity, such as the user 24, that caused or is otherwise associated with the request 18. The security token 22 may also include permitted actions with respect to the application 12. The identity provider 20 may also digitally sign the security token 22 with a digital signature of the identity provider 20.

The transaction originator 16 receives the security token 22 and sends a transaction 26 and the security token 22 to the validating service 14-1. The validating service 14-1 receives the transaction 26 and the security token 22 indicating that the transaction originator 16 is authorized to submit the transaction 26 to the application 12. The validating service 14-1 may validate the digital signature of the security token 22.

The validating service 14-1 obtains a transaction identifier (ID) 28 that uniquely identifies the transaction. In some embodiments, the transaction originator 16 may provide the transaction ID 28. In some embodiments, a module between the transaction originator 16 and the validating service 14-1 may generate the transaction ID 28, and the transaction ID 28 may accompany the transaction 26. In other embodiments, the validating service 14-1 may generate the transaction ID 28. In other embodiments, the validating service 14-1 may invoke a transaction identifier generation service to obtain the transaction ID 28.

The validating service 14-1 causes a message 30 that includes the transaction ID 28 and data 32 derived from the security token 22 to be sent to a collector service 33. The collector service 33 may be part of the application 12 or may be separate from the application 12. The data 32 may include any desired information contained in the security token 22, including, by way of non-limiting example, information that identifies the entity that caused the transaction 26 to be submitted to the application 12. In this example, the information includes the name of the user 24. The data 32 may also identify certain access rights that the user 24 may have, and/or certain access rights that the user 24 does not have. Examples of a security token are discussed below, and any such information may be included in the data 32.

The collector service 33 receives the transaction ID 28 and the data 32, generates a record 34-1, and stores the record 34-1 in a datastore 36, as illustrated in FIG. 1B. The record 34-1 correlates the transaction ID 28 with the user 24. The collector service 33, or another service 14, may determine that more information may be necessary and/or desired than is provided in the security token 22. The collector service 33 may then use information in the security token 22 to interface with an Identity and Access Management (IAM) provider to obtain additional information about the transaction originator 16. Such additional information may include, by way of non-limiting example, a client application identifier, a user identifier, a group identifier, roles, privileges granted for the specific transaction, an Internet protocol (IP) address, a geolocation of the transaction originator 16, and what policies enabled the initiation of the transaction 26. The collector service 33 stores such information in conjunction with the transaction ID 28.

The validating service 14-1 may now begin to process the transaction 26. In this example, the services 14 comprise services that utilize a RESTful API (sometimes referred to as a REST API) to communicate with one another. The validating service 14-1 invokes 38 a particular API entrypoint of the service 14-2 using a hypertext transfer protocol (HTTP) GET request and provides, in conjunction with the invocation, the transaction ID 28. The transaction ID 28 may be provided as a parameter in the HTTP GET request, or in a header of the HTTP GET request, or via any other suitable manner in conjunction with the HTTP GET request. The term "invoke" as used herein refers to any mechanism for accessing, transferring control, or otherwise communicating between a first entity, such as a service, and a second entity. The term "invoke" may also be referred to as a request. By way of non-limiting example, invoking can refer to the invocation of a method of the second entity, such as a Java method, can refer to a message passed to a datastore, can refer to the reading of a file, can refer to the invocation of an API entrypoint, or can refer to the insertion of a message into a message queue.

One or more, or each of the services 14, may cause the transaction ID 28 and metadata about an invocation to be sent to the collector service 33 upon the occurrence of certain events, such as, by way of non-limiting example, when an information source, such as the respective service 14, is invoked, when the respective service 14 invokes another information source, and/or when a service 14 receives a response from an invoked service 14. One or more, or each, of the services 14 may also cause metadata about information contained in a response and the transaction ID 28 to be sent to the collector service 33 upon receiving a response from an invoked datastore or service 14. The term "cause" as used herein refers to an actor directly or indirectly performing an action. For example, in this context, the service 14 may directly send metadata and the transaction ID 28 to the collector service 33, or may indirectly send the metadata and the transaction ID 28 to the collector service 33. For example, the service 14 may send information regarding an invocation or a response, and the transaction ID 28, to an intermediary service 14 that first processes the information to generate the metadata and then sends the metadata and the transaction ID 28 to the collector service 33, such that the service 14 caused the metadata and the transaction ID 28 to be sent to the collector service 33.

The metadata may include sensitive data classification types, such as sensitive data categorizations, and sensitive data sub-categorization types. The sensitive data categorization may indicate that a response received by a service 14, or data used in an invocation of a service 14, included sensitive data, such as Personally Identifiable Information (PII). Sensitive data sub-categorization types may include types of PII, such as a name, an address, a credit card number, a driver's license identifier, a social security number, and the like.

Prior to or subsequent to the validating service 14-1 invoking the particular API entrypoint of the service 14-2, the service 14-1 may generate a message 40 that includes the transaction ID 28 and metadata 42 associated with (M.A.W.) the invocation of the service 14-2, such as the actual API entry point of the service 14-2 invoked by the validating service 14-1, and metadata about the data provided in the HTTP GET request. The metadata about the data provided in the HTTP GET request may comprise, for example, metadata that indicates whether the data provided in the HTTP GET request contained sensitive data, and if so, the metadata may comprise sensitive data sub-categorization types of the data provided in the HTTP GET request. The validating service 14-1 sends the message 40 to the collector service 33. The collector service 33 receives the message 40, generates a record 34-2, and stores the record 34-2 in the datastore 36, as illustrated in FIG. 1B.

An invoked service 14 may be referred to as a downstream service 14 with respect to the invoking service 14. The invocation of the service 14-2 is a request that includes input data associated with the transaction that is provided by the invoking service 14-1 in the HTTP GET request. The input data includes the transaction ID 28. Although not illustrated due to spatial considerations and ease of explanation, each invoked service 14 may also generate a message that includes the transaction ID 28 and metadata associated with (M.A.W.) the invocation of the service 14, such as the actual API entry point of the service 14 invoked by the upstream service 14, and metadata about the data provided in the HTTP GET request, and the like. The invoked service 14 may then send the message to the collector service 33 so that the collector service 33 can generate a corresponding record 34 and store the record 34 in the datastore 36.

In this example, the service 14-2 may perform certain processing and determine that information, in the form of one or more data items, needs to be obtained from a datastore 46 to provide a response to the invoking service 14-1. In this example, the datastore 36 is accessed via a datastore layer (DSL) service 14-3 such that any service 14 that wants to retrieve a data item from or store a data item to the datastore 36 does so via the DSL service 14-3. The service 14-2 invokes a particular API entrypoint of the DSL service 14-3 using an HTTP GET request and provides, in conjunction with the invocation, the transaction ID 28 and information that indicates that the DSL service 14-3 is to obtain one or more data items from the datastore 46. The term "DSL service" as used herein refers to any service that obtains information from a datastore.

Prior to or subsequent to the service 14-2 invoking the particular API entrypoint of the DSL service 14-3, the service 14-2 may generate a message 50 that includes the transaction ID 28 and metadata 52 associated with (M.A.W.) the invocation of the DSL service 14-3, such as the actual API entry point of the service 14-3 invoked by the service 14-2, and metadata about the data provided in the HTTP GET request. The service 14-2 sends the message 50 to the collector service 33. The collector service 33 receives the message 50, generates a record 34-3, and stores the record 34-3 in the datastore 36, as illustrated in FIG. 1B.

The invocation of the DSL service 14-3 is a request that includes input data associated with the transaction that is provided by the invoking service 14-2 in the HTTP GET request. The input data includes the transaction ID 28 and, in this example, a request to access certain information from the datastore 46. In this example, the datastore 46 comprises a SQL database, and the information in the request includes a SQL query that identifies one or more data fields, conditions, and/or values. The term "data field" refers to a field of data maintained in a datastore. A data field has a name, or label, via which the data field can be referenced. A data field may store a value, which is referred to herein as a data item. In the context of a SQL database, each row of a table comprises the same data fields. Such data fields may also be referred to as columns. Each row may contain different data items. For example, a "customer" table may include a "Name" data field (or column), an "Address" data field (or column), and a "Customer Identifier" data field (or column). Each row in the table may store information about a different customer, and thus, the data items stored in each row differ.

The DSL service 14-3 includes, or is in communication with, a sensitive data classifier 54. As will be discussed in greater detail below, the sensitive data classifier 54 may be implemented, by way of non-limiting example, as a sidecar container or as a centralized service. The sensitive data classifier 54 operates to determine whether the DSL service 14-3 attempts to obtain data items stored in data fields that have been identified as sensitive data fields based on query information associated with a query. A data item stored in a sensitive data field may be referred to herein as a sensitive data item. In one embodiment, the query information associated with the query is the query itself. The sensitive data classifier 54 may receive the query that the DSL service 14-3 issues to the datastore 46 and examine the query to identify the data fields (i.e., column names) that are the subject of the query.

In some implementations, the implementor of the application 12 may generate a data catalog 56 that identifies those data fields of the datastore 46 that are deemed to be sensitive data fields. The sensitive data classifier 54 may access the data catalog 56 to thereby identify one or more data fields of the datastore 46 as being sensitive data fields. The data catalog 56 may comprise a cache version of a centralized data catalog that can be accessed by any of the services 14.

Based on the data catalog 56 and the query, the sensitive data classifier 54 may determine that the query seeks data items from sensitive data fields. The sensitive data classifier 54 may generate a message 58 that includes the transaction ID 28 and metadata 60 associated with (M.A.W.) the invocation of the datastore 46, which in this example includes classification information that identifies the data fields and the particular sensitive data field classification, such as a driver's license identifier, an address, a name, a credit card number, a bank account number, or the like. The sensitive data classifier 54 may then send the message 58 to the collector service 33. The collector service 33 receives the message 58 and generates a record 34-4 and stores the record 34-4 in the datastore 36, as illustrated in FIG. 1B.

In some examples, the data catalog 56 may not exist, or, the query may be sufficiently complex that the sensitive data classifier 54 may be unable to determine what data fields are the subject of the query. In either situation, the sensitive data classifier 54 may await the results of the query from the datastore 46 to determine whether the query requested sensitive data items.

The DSL service 14-3 invokes 62 the datastore 46 by issuing a query 63 to the datastore 46. The DSL service 14-3 receives a response 64 from the datastore 46 that contains data items 65 that meet the criteria of the query 63. In this example, the query information associated with the query is the response 64 from the datastore 46. The DSL service 14-3 provides the response 64 to the sensitive data classifier 54. The sensitive data classifier 54 may utilize a plurality of different regular expressions (REGEXs) 66-1-66-N (generally, REGEXs 66) to identify sensitive data items. Each REGEX 66 may be designed to determine whether a data item 65 has a pattern that matches a particular sensitive data item. For example, the REGEX 66-1 may determine that a data item 65 having a pattern of xxx-xx-xxxx is a sensitive data item of type social security number. After each of the data items 65 has been analyzed, the sensitive data classifier 54 may generate the message 58. The sensitive data classifier 54 includes in the metadata 60 classification information that indicates that the query 63 requested one or more data items 65 that have been classified as sensitive data items. The classification information may identify the one or more data items 65 and provide for each data item 65 the particular sensitive data field classification, such as a driver's license identifier classification, an address classification, a name classification, a credit card number classification, a bank account number classification, or the like. The metadata 60 may also include a quantity of data items 65 that were returned for each sensitive data classification, such as 15 driver's license identifiers, 18 social security numbers, 5 credit card numbers, and the like. For privacy reasons or concerns, in some implementations the sensitive data classifier 54 may not provide the actual data items 65 to the collector service 33.

In some embodiments, a dictionary of common names may be maintained. Instead of or in addition to processing the data items 65 with REGEXs, it may be determined if a data item 65 matches a name in the dictionary, then the column that corresponds to the data item 65 comprises a name column. In some embodiments, a Luhn algorithm may be used to determine if data items 65 that comprise 16 digit numbers are credit card numbers.

In some embodiments, the sensitive data classifier 54 may store sensitive data items 65 in a probabilistic data structure such as, by way of non-limiting example, a Bloom filter, and send the probabilistic data structure to the collector service 33. The sensitive data items 65 are hashed or otherwise altered when stored in the probabilistic data structure such that one cannot directly obtain the data items 65 from the probabilistic data structure. However, as will be discussed below in greater detail, the probabilistic data structure can subsequently be used to determine a quantity of sensitive data items 65 that are returned to the transaction originator 16. The sensitive data classifier 54 may determine the physical characteristics of the Bloom filter, such as number of bits and hash functions, in real time, based on, for example, the quantity of data items obtained from the datastore 46.

As an example, the sensitive data classifier 54 may determine that 18 social security numbers have been returned by the datastore 46 in response to the query 63. The sensitive data classifier 54 may store the 18 social security numbers in a first probabilistic data structure having a first bit size and using a first hash function. The sensitive data classifier 54 may determine that 5 credit card numbers have been returned by the datastore 46 in response to the query 63. The sensitive data classifier 54 may store the 5 credit card numbers in a second probabilistic data structure having a second bit size and using a second hash function. The sensitive data classifier 54 may send the first and second probabilistic data structures and the transaction ID 28 to the collector service 33 along with information indicating that 18 social security numbers have been stored in the first probabilistic data structure and that five credit card numbers have been stored in the second probabilistic data structure. The sensitive data classifier 54 may also send the physical characteristics of the probabilistic data structures to the collector service 33.

The DSL service 14-3 may return a response 68 to the invoking service 14-2. The response 68 may include information regarding the data items 65 that have been classified as sensitive data items and one or more of the data items 65. Such information may be stored in a header of the response 68, such as an HTTP request header, or the like. The invoking service 14-2 may generate a message 70 that includes the transaction ID 28 and metadata 72 associated with the response 68, and send the message 70 to the collector service 33. The collector service 33 may generate a corresponding record 34-5 and store the record 34-6 in the datastore 36. The header of the response 68 may also include information about the classification of the data fields by the sensitive data classifier 54. For example, if the sensitive data classifier 54 generated a probabilistic structure, such as a Bloom filter, the response 68 may include the characteristics of the Bloom filter(s) generated by the sensitive data classifier 54, such as the number of bits, hash functions utilized, and the like. This information may be passed along by each upstream service 14 and used by one or more of the upstream services 14, such as the validating service 14-1, when generating a probabilistic structure, so that operations, such as an intersection, can be performed between the probabilistic structure(s) generated by the service 14-1 and probabilistic structure(s) generated by the service 14-3. This also facilitates dynamic resizing of such probabilistic structures based on the size of the data items obtained from the datastore 46 and classes to improve performance and/or classification accuracy. The header of the response 68 may also include information such as an indication that no sensitive data fields were accessed, or information that identifies the specific sensitive data fields that were accessed. The header of the response 68 may identify specific REGEXs that the sensitive data classifier 54 used to identify sensitive data items. In some implementations, the sensitive data classifier 54 may decide to refrain from sensitive data classification, such as for performance reasons. Such information may also be provided in the response 68.

The invoking service 14-2 may initiate certain processing based on the response 68 and return a response 74 to the validating service 14-1. The response 74 includes any information provided by the service 14-3 relating to the classification of sensitive data fields, as discussed above, such as REGEXs that were used to identify sensitive data items, physical characteristics of Bloom filters generated by the sensitive data classifier 54, information indicating whether sensitive data fields were accessed, and the like.

The validating service 14-1 may generate a message 76 that includes the transaction ID 28 and metadata 78 associated with the response 74, and send the message 76 to the collector service 33. The collector service 33 may generate a corresponding record 34-6 and store the record 34-6 in the datastore 36.

The validating service 14-1 may generate a response 80 to return to the transaction originator 16. The validating service 14-1 may also store, in a probabilistic data structure, each data item that is included in the response 80, and send the probabilistic data structure to the collector service 33. The collector service 33 can perform an intersection operation between the first and second probabilistic data structures provided by the sensitive data classifier 54 and the probabilistic data structure provided by the validating service 14-1 to determine how many sensitive data items are being returned to the transaction originator 16 in the response 80. For example, the collector service 33 can perform an intersection operation between the first probabilistic data structure received from the sensitive data classifier 54 and the probabilistic data structure received from the validating service 14-1 to determine the quantity, or an approximate quantity, of social security numbers that were provided by the validating service 14-1 to the transaction originator 16 in the response 80. As an example, by performing the intersection operation between the first probabilistic data structure received from the sensitive data classifier 54 and the probabilistic data structure received from the validating service 14-1, the collector service 33 may determine that only a single social security number of the 18 social security numbers stored in the first probabilistic data structure were provided to the transaction originator 16. Similarly, by performing the intersection operation between the second probabilistic data structure received from the sensitive data classifier 54 and the probabilistic data structure received from the validating service 14-1, the collector service 33 may determine that all five credit card numbers stored in the second probabilistic data structure were provided to the transaction originator 16. In this manner, the collector service 33 can determine, irrespective of how many sensitive data items were obtained by the application 12 during the processing of a transaction, the precise number and type of sensitive data items that were provided by the application 12 to a transaction originator.

In other examples, the validating service 14-1, in lieu of generating a probabilistic structure, or in addition, may process the response 80 with REGEXs identical to the REGEXs 66 to determine whether any sensitive data items are provided in the response 80. As discussed above, in some embodiments, the validating service 14-1 may access the response 74 to determine what REGEXs were utilized by the sensitive data classifier 54 such that the validating service 14-1 need not process the response 80 with all of the REGEXs 66. The validating service 14-1 may then provide the types and quantities of sensitive data items identified via the REGEX processing to the collector service 33.

As will be discussed below, a sensitive data visualizer may access the datastore 36 and query the datastore 36 to identify transactions that involved sensitive data, identify the particular services 14 and other information sources that involved sensitive data, identify the entities responsible for the transactions, identify sensitive data sub-categorization types, identify how many sensitive data items and types of data items were returned to a transaction originator, and the like.

Figure 2:
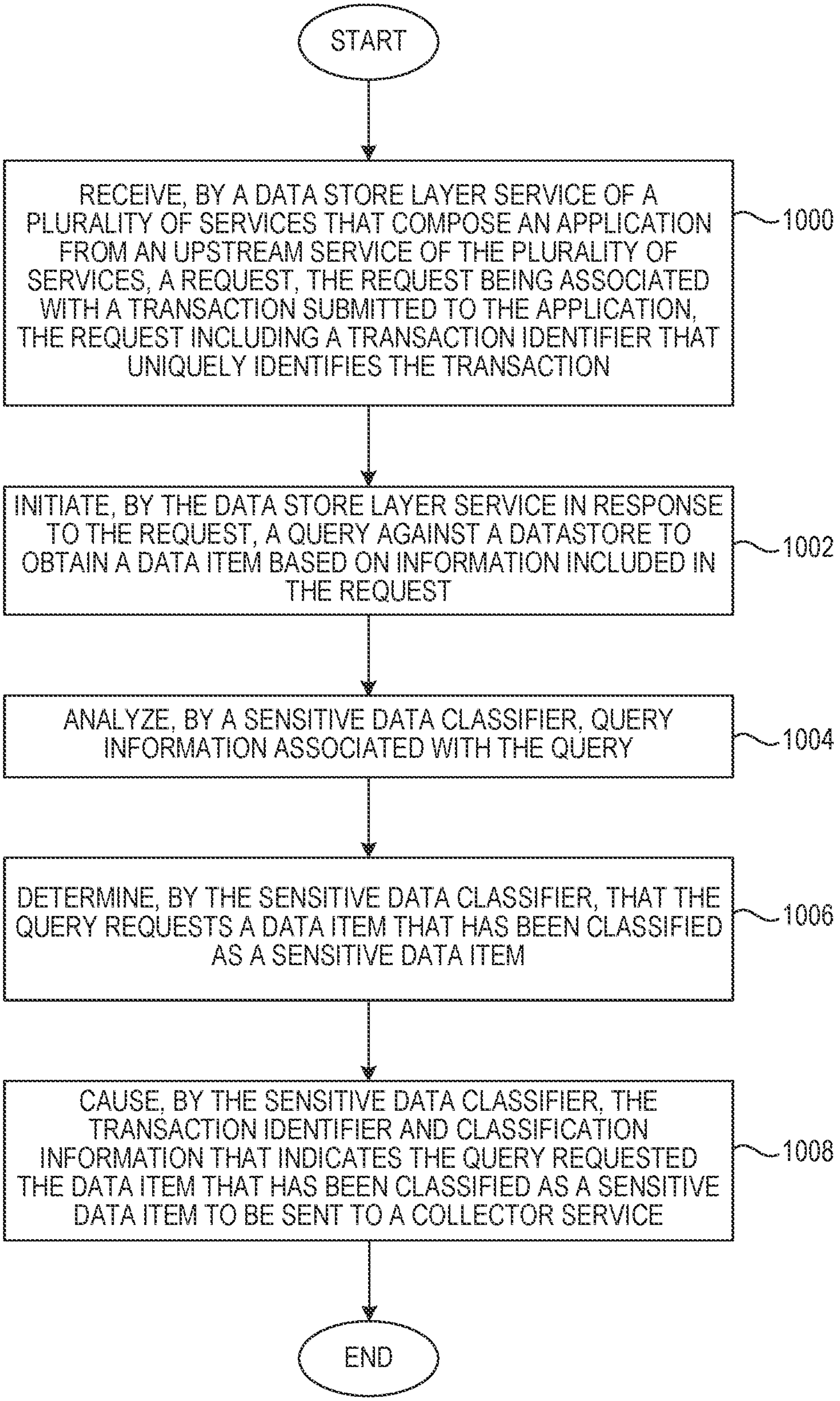
FIG. 2 is a flowchart of a method for sensitive data classification for micro-service applications according to one embodiment.

FIG. 2 is a flowchart of a method for sensitive data classification for micro-service applications according to one embodiment. FIG. 2 will be discussed in conjunction with FIGS. 1A-1B. The DSL service 14-3 receives, from the upstream service 14-2, a request, the request being associated with the transaction 26 submitted to the application 12, the request including the transaction ID 28 that uniquely identifies the transaction 26 (FIG. 2, block 1000). The DSL service 14-3, in response to the request, initiates the query 63 against the datastore 46 to obtain a data item 65 based on information included in the request (FIG. 2, block 1002). The sensitive data classifier 54 analyzes query information associated with the query 63 (FIG. 2, block 1004). The sensitive data classifier 54 determines that the query 63 requests a data item 65 that has been classified as a sensitive data item (FIG. 2, block 1006). The sensitive data classifier 54 causes the transaction ID 28 and metadata classification information 60 that indicates the query 63 requested the data item 65 that has been classified as a sensitive data item to the collector service 33 (FIG. 2, block 1008).

FIG. 3 illustrates the security token 22 according to one embodiment. The security token 22 may contain an issuer field 77 that identifies the principal that issued the security token, in this example, the identity provider 20. The security token 22 may also contain a name key-value pair 79 that identifies the entity associated with the transaction, in this example, the user 24. The security token 22 may also contain a preferred name key-value pair 83 that identifies an email address associated with the entity associated with the transaction. The security token 22 may also contain a digital signature 81 of the identity provider 20. The validating service 14-1 may extract any of the information contained in the security token 22, including the entire contents of the security token 22, and send the information to the collector service 33 to correlate the transaction ID 28 with the security token 22, and thus to the user 24.

Figure 4:
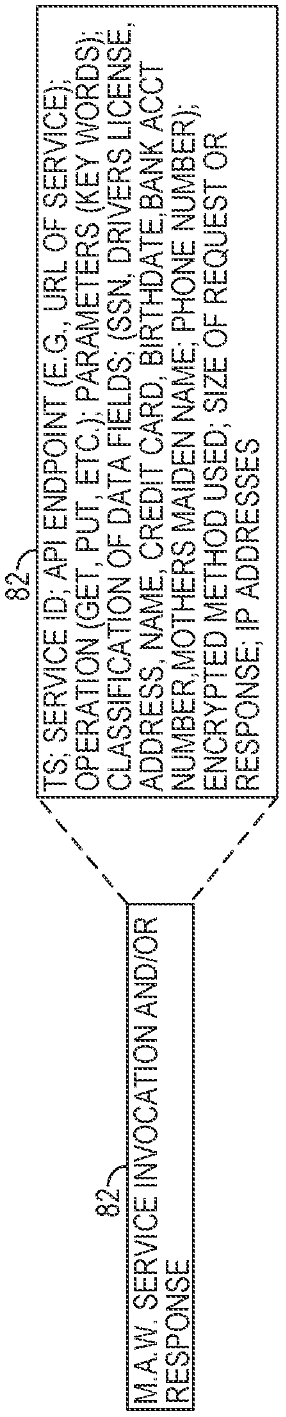
FIG. 4 illustrates example metadata that may be generated and provided to a collector by an invoking service or an invoked service as metadata associated with the invocation of a service or metadata associated with a response of an invoked service according to one implementation.

FIG. 4 illustrates example metadata 82 that may be generated and provided to the collector service 33 by an invoking service 14 or an invoked service 14 as metadata associated with the invocation of a service 14, or metadata associated with a response from an invoked service 14. By way of non-limiting example, the metadata 82 may include a timestamp (TS) of the invocation or response; an indication that the data is associated with a request or a response; the size of the request or response; an identifier of the service 14 that was invoked; an identifier of the invoking service 14; the API endpoint that was invoked (e.g., the URL that was invoked); the RESTful HTTP operation (e.g., GET, PUT); parameters and/or data items included in the invocation or response; sensitive data sub-categorization types of data contained in the invocation or response such as a social security number, a driver's license identifier, an address, a name, a credit card number, a birth date, a bank account number, a mother's maiden name, a phone number; and an indication as to whether an encrypted path was used for the invocation. If desired, the metadata 82 may include the sensitive data sub-categorization types and the actual sensitive data contained in the invocation or response. Alternatively, for privacy considerations, the metadata 82 may contain only the sensitive data sub-categorization types of the data contained in the invocation or response and omit the sensitive data. In some embodiments, the metadata 82 may contain the sensitive data sub-categorization types of the data and all non-sensitive data, but omit sensitive data.

Figure 5:
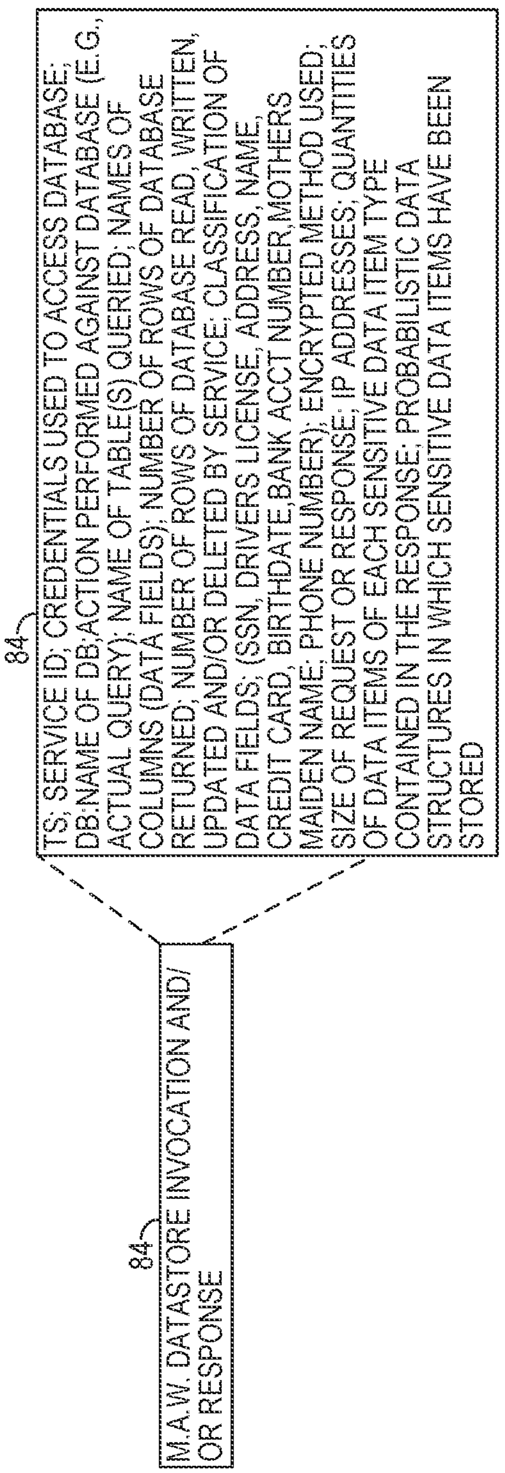
FIG. 5 illustrates example metadata that may be generated and provided to a collector as metadata associated with the invocation of a datastore or metadata associated with a response of an invoked datastore according to one implementation.

FIG. 5 illustrates example metadata 84 that may be generated and provided to the collector service 33 as metadata associated with the invocation of a datastore information source or metadata associated with a response from an invoked datastore information source. By way of non-limiting example, the metadata 84 may include a timestamp (TS) of the invocation or response; an indication that the data is associated with a request or a response; an identifier of the service 14 that invoked the datastore; the credentials used to access the datastore (e.g., user identifier and password); a name of the datastore that was accessed; the specific action that was performed against datastore (e.g., the actual SQL command, such as a query, read, delete or modify that was issued to the datastore (e.g., QUERY=SELECT FNAME, ADDRESS FROM USER_DATA WHERE CUST_ID=####); the names of the datastore tables that were accessed; the names of the columns (e.g., data items) that were accessed; the number of rows of the datastore that were returned; the number of returned rows of the datastore that were actually read by the service 14; sensitive data sub-categorization types of data contained in the data requested and/or received from the datastore, such as a social security number, a driver's license identifier, an address, a name, a credit card number, a birth date, a bank account number, a mother's maiden name, a phone number; and an indication as to whether an encrypted path was used for the invocation. If desired, the metadata 84 may include the sensitive data sub-categorization types and the actual sensitive data received. Alternatively, for privacy considerations, the metadata 84 may contain only the sensitive data sub-categorization types of the data received from the datastore and omit the sensitive data. In some embodiments, the metadata 84 may contain the sensitive data sub-categorization types of the data and all non-sensitive data, but omit sensitive data. The metadata 84 may identify the quantities of data items of each sensitive data item type contained in the response. The metadata 84 may include probabilistic data structures in which sensitive data items have been stored.

As the collector service 33 receives the metadata associated with service invocations, datastore invocations, corresponding responses and the like, the collector service 33 may store such data in the datastore 36 such that the data is indexed and searchable by any desired fields, and correlated with the transaction ID 28 and the user 24.

Figure 6:
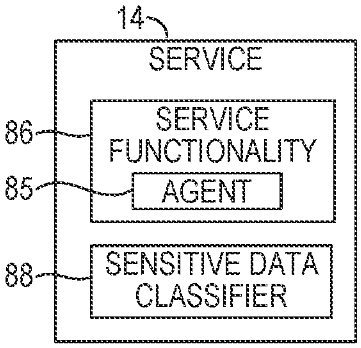
FIG. 6 is a block diagram of a service according to one implementation.

FIG. 6 is a block diagram of a service 14 according to one implementation. The service 14 implements a desired service functionality 86 associated with processing a transaction. For example, for the DSL service 14-3, service functionality 86 may involve sending the query 63 to the datastore 46, and receiving the response 64 with the data items 65 from the t datastore 46. The embodiments disclosed herein may be implemented in part via an agent 85 that is integral with the service functionality 86. The agent 85 operates to process any invocations by the service functionality 86 and any responses received by the service functionality 86. The agent 85 may then send any invocations and responses, along with the transaction ID associated with the invocation or response, to a sensitive data classifier 88. The agent 85 may be developed in conjunction with the service functionality 86, or may be coupled to the service functionality 86 in a manner that is transparent to the service functionality 86 and does not require modification of the existing service functionality 86. As an example, in a JAVA environment, the agent 85 may be implemented via byte-code injection and, in the case of Python, by monkey patching or wrappers.

The sensitive data classifier 88 receives information from the agent 85 related to the invocations of the service 14 and responses received by the service 14. The information may include all the data used in the invocation and, in the case of a response, all the data received by the service 14.

The sensitive data classifier 88 operates as described above with regard to the sensitive data classifier 54. The sensitive data classifier 88 analyzes the information received from the agent 85 to determine if the information contains sensitive data and, if so, identifies sensitive data sub-categorization types of such data. The data that is classified includes metadata associated with an invocation, such as data received in a RESTful API invocation, data sent by the service 14 to an information source such as a datastore, data received by the service 14 from an information source, and the like. The sensitive data classifier 88 may classify the data in any number of ways, including those discussed above with regard to the sensitive data classifier 54. The sensitive data classifier 88 may contain a list of data items, such as predetermined key words, which are associated with sensitive data, such as "SSN", "DRIVERS LICENSE", "ADDRESS", and the like, and parse the data to determine if such keywords exist in the data. The sensitive data classifier 88 may utilize a plurality of different regular expressions (REGEXs) that identify search patterns for sensitive data items. For example, a data item having a format of xxx-xx-xxxx may be classified as a sensitive data sub-category type of SSN. The sensitive data classifier 88 may utilize a machine learned model that has been trained to identify and classify sensitive data items. The sensitive data classifier 88 may also remove from the information any data that is classified as sensitive data and, in its place, identify the sensitive data sub-categorization types of such data. As an example, if a response includes an actual social security number (SSN), the sensitive data classifier 88 may remove the SSN from the information and replace it with an SSN_ID indicating that an SSN was in the information.

Figure 7:
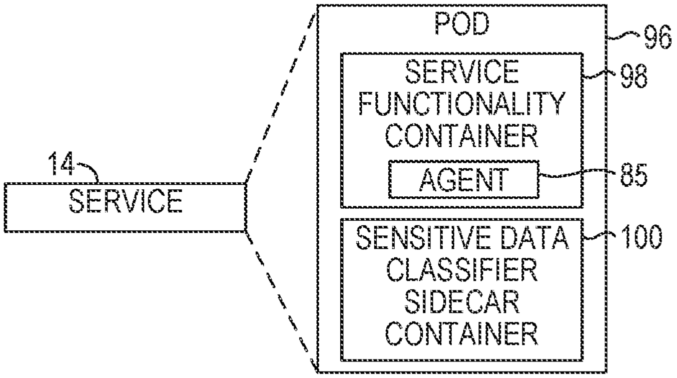
FIG. 7 is a block diagram of a service according to another implementation.

FIG. 7 illustrates a service 14 according to another embodiment. In this embodiment, the service 14 comprises a Kubernetes pod 96. The Kubernetes pod 96 includes a service functionality container 98 that implements the desired functionality of the service 14 and the agent 85. The Kubernetes pod 96 includes a sensitive data classifier sidecar container 100 that implements the functionality of the sensitive data classifier 54 discussed above. In some embodiments, Kubernetes may automatically inject the sensitive data classifier sidecar container 100 into any pod that has a particular predetermined label, such as "TRACESENSITIVEDATA", and thus the sensitive data classifier sidecar container 100 can be implemented in a manner that is transparent to the service functionality container 98 and does not require modifications of the service functionality container 98.

In other embodiments, each service 14 may include the agent 85, but a centralized sensitive data classifier may implement the sensitive data classifier 54. Each agent 85 sends the transaction ID and information associated with an invocation or a response to the centralized sensitive data classifier, which implements the data classification, sensitive data removal, and, if desired, probabilistic data structure generation discussed above, and then sends a message containing the classification information and probabilistic data structure(s) to the collector service 33.

Figure 8:
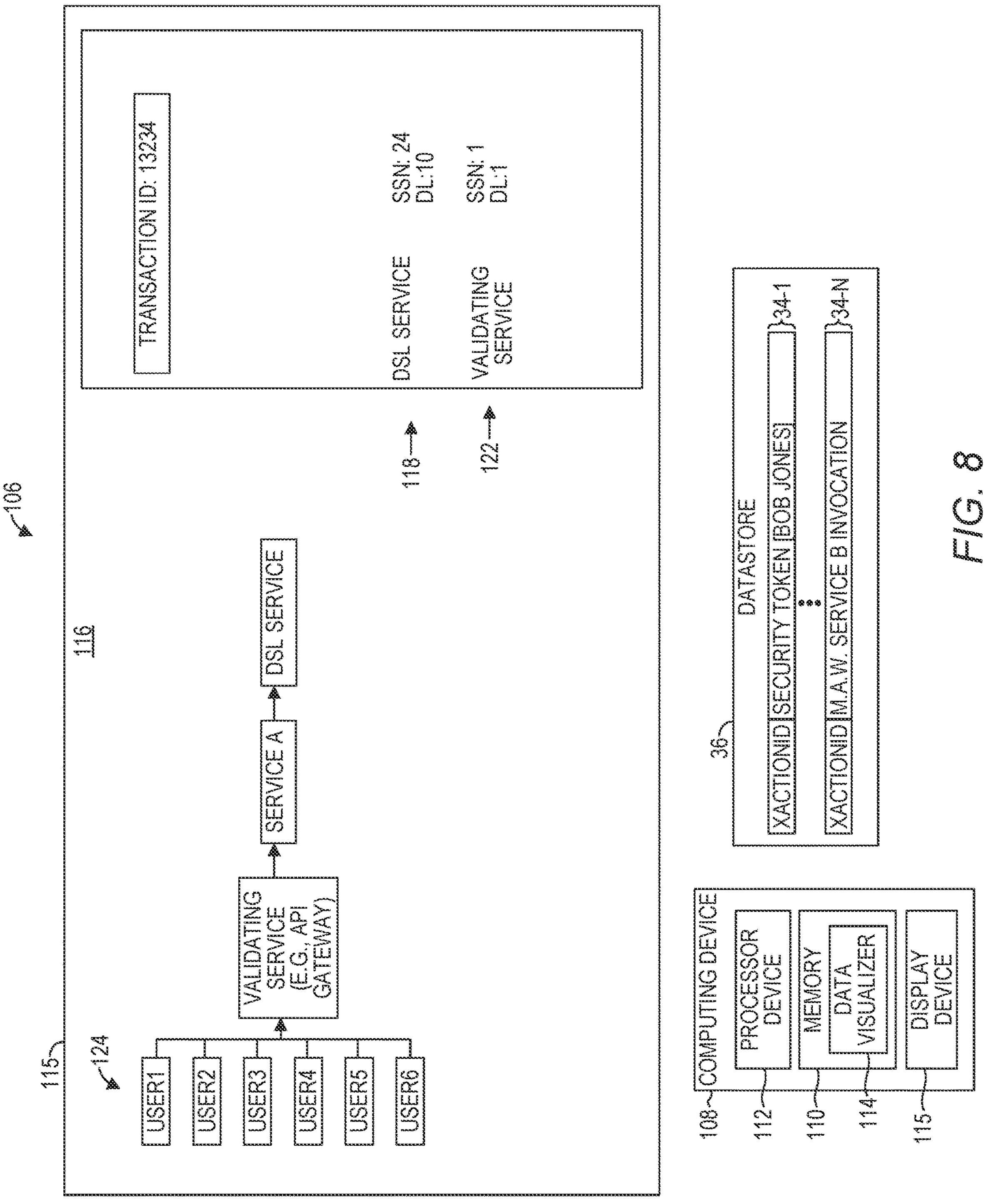
FIG. 8 is a block diagram of an environment for visualizing data according to one embodiment.

FIG. 8 is a block diagram of an environment 106 for visualizing data according to one embodiment. The environment 106 includes a computing device 108 that in turn includes a memory 110 and a processor device 112 coupled to the memory 110. A data visualizer 114 executes in the memory 110. The data visualizer 114 accesses the datastore 36 which comprises a plurality of records 34-1-34-N. There may be hundreds, thousands, or millions of records 34-1-34-N in the datastore 36.

Based on the records 34, the data visualizer 114 generates and presents, on a display device 115, for a particular transaction having a transaction ID of 13234, user interface imagery 116 that includes information 118 that indicates the DSL service 14-3 obtained 24 social security numbers and 10 driver's license identifiers from the datastore 46 while processing transaction 13234. The user interface imagery 116 also includes information 122 that indicates the validating service 14-1 returned one social security number and one driver's license identifier to the transaction originator 16 while processing transaction 13234.

Because the data visualizer 114 is a component of the computing device 108, functionality implemented by the data visualizer 114 may be attributed to the computing device 108 generally. Moreover, in examples where the data visualizer 114 comprises software instructions that program the processor device 112 to carry out functionality discussed herein, functionality implemented by the data visualizer 114 may be attributed herein to the processor device 112.

Figure 9:
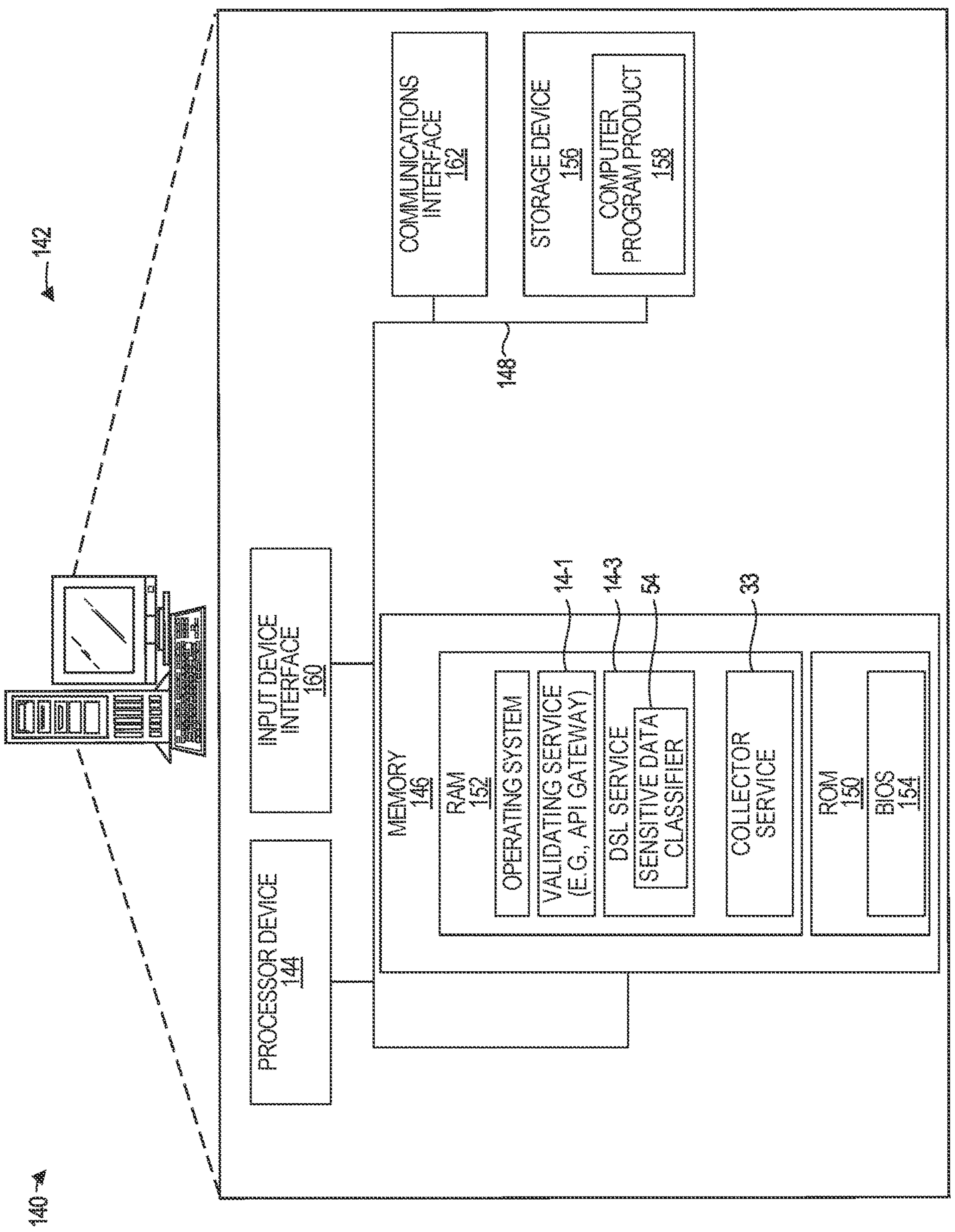
FIG. 9 is a block diagram of a system suitable for implementing the embodiments disclosed herein.

FIG. 9 is a block diagram of a computing system 140 suitable for implementing embodiments disclosed herein. The computing system 140 includes one more computing devices, each of which may be configured substantially similarly to a computing device 142. The computing device 142 includes one or more processor devices 144, a memory 146, and a system bus 148. The system bus 148 provides an interface for system components including, but not limited to, the memory 146 and the processor devices 144. The processor devices 144 can be any commercially available or proprietary processor devices.

The system bus 148 may be any of several types of bus structures that may further interconnect to a memory bus (with or without a memory controller), a peripheral bus, and/or a local bus using any of a variety of commercially available bus architectures. The memory 146 may include non-volatile memory 150 (e.g., read-only memory (ROM), erasable programmable read-only memory (EPROM), electrically erasable programmable read-only memory (EEPROM), etc.), and volatile memory 152 (e.g., random-access memory (RAM)). A basic input/output system (BIOS) 154 may be stored in the non-volatile memory 150 and can include the basic routines that help to transfer information between elements within the computing device 142. The volatile memory 152 may also include a high-speed RAM, such as static RAM, for caching data.

The computing device 142 may further include or be coupled to a non-transitory computer-readable storage medium such as a storage device 156, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 156 and other drives associated with computer-readable media and computer-usable media may provide non-volatile storage of data, data structures, computer-executable instructions, and the like.

A number of modules can be stored in the storage device 156 and in the volatile memory 152, including an operating system and one or more program modules, such as one or more of the services 14, which may implement the functionality described herein in whole or in part. All or a portion of the examples may be implemented as a computer program product 158 stored on a transitory or non-transitory computer-usable or computer-readable storage medium, such as the storage device 156, which includes complex programming instructions, such as complex computer-readable program code, to cause the processor device 144 to carry out the steps described herein. Thus, the computer-readable program code can comprise software instructions for implementing the functionality of the examples described herein when executed on the processor device 144.

An operator may also be able to enter one or more configuration commands through a keyboard (not illustrated), a pointing device such as a mouse (not illustrated), or a touch-sensitive surface such as a display device. Such input devices may be connected to the processor device 144 through an input device interface 160 that is coupled to the system bus 148 but can be connected by other interfaces such as a parallel port, an Institute of Electrical and Electronic Engineers (IEEE) 1394 serial port, a Universal Serial Bus (USB) port, an IR interface, and the like. The computing device 142 may also include a communications interface 162 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

receiving, by a datastore layer service of a plurality of services that compose an application from an upstream service of the plurality of services, a request, the request being associated with a transaction submitted to the application, the request including a transaction identifier that uniquely identifies the transaction;

initiating, by the datastore layer service in response to the request, a query against a datastore to obtain a data item based on information included in the request;

analyzing, by a sensitive data classifier, query information associated with the query;

determining, by the sensitive data classifier, that the query requests a data item that has been classified as a sensitive data item; and in response to the determination that the query requests the data item that has been classified as a sensitive data item, cause, by the sensitive data classifier, the transaction identifier and classification information that indicates the query requested the data item that has been classified as a sensitive data item to be sent to a collector service, wherein the collector service receives the transaction identifier and the classification information, and stores the classification information in a datastore based on the transaction identifier, wherein the classification information is correlated with the transaction identifier and a security token in the datastore, the security token comprising an identity of an entity, associated with the transaction, that identifies and authorizes a transaction originator of the transaction prior to processing the transaction.

2. The method of claim 1 wherein the query information associated with the query comprises the query, and further comprising:

determining, by the sensitive data classifier, that a data catalog that classifies data fields of the datastore exists; and determining, by the sensitive data classifier, based on the query and the data catalog, that the data item requested by the query is maintained in a data field that has been identified as a sensitive data field.

3. The method of claim 1 wherein the query information associated with the query comprises the data item obtained from the datastore, and further comprising:

processing the data item with at least one regular expression; and determining, based on processing the data item with the at least one regular expression, to classify the data item as a sensitive data item.

4. The method of claim 1 wherein sending, by the sensitive data classifier to the collector service, the transaction identifier and the classification information that indicates the query requested the data item that has been identified as a sensitive data item further comprises sending, by the sensitive data classifier to the collector service, the transaction identifier and the classification information that indicates the query requested the data item that has been identified as a sensitive data item and refraining from sending the data item to the collector service.

5. The method of claim 1 wherein the query information associated with the query comprises a plurality of data items obtained from the datastore, and further comprising:

determining, by the sensitive data classifier, that the plurality of data items has been classified as a plurality of sensitive data items;

determining a quantity of the plurality of data items; and sending, by the sensitive data classifier to the collector service, the transaction identifier, classification information that indicates the query requested the plurality of data items that has been identified as a plurality of sensitive data items, and the quantity of the plurality of data items.

6. The method of claim 1 wherein the query information associated with the query comprises a plurality of data items obtained from the datastore, and further comprising:

determining, by the sensitive data classifier, that the plurality of data items has been classified as a plurality of sensitive data items;

storing the plurality of data items in a first probabilistic data structure; and sending, by the sensitive data classifier to the collector service, the first probabilistic data structure.

7. The method of claim 6 wherein the first probabilistic data structure comprises a Bloom filter.

8. The method of claim 6, further comprising:

determining, by the sensitive data classifier, that the plurality of data items comprises a first plurality of data items that is associated with a first data field that is classified as a sensitive data field and a second plurality of data items that is associated with a second data field that is classified as a sensitive data field;

storing the first plurality of data items in the first probabilistic data structure;

storing the second plurality of data items in a second probabilistic data structure; and sending, by the sensitive data classifier to the collector service, the first probabilistic data structure and the second probabilistic data structure.

9. The method of claim 6 wherein the transaction is submitted to the application via a validating service by an entity, and further comprising:

receiving, at the validating service, a response to be provided to the entity, the response comprising the plurality of data items;

storing, by the validating service, the data items in a second probabilistic data structure; and sending, by the validating service to the collector service, the second probabilistic data structure.

10. The method of claim 9 further comprising:

receiving, by the collector service, the second probabilistic data structure; and determining a quantity of data items, among the plurality of data items, stored in the first probabilistic data structure that are being provided to the entity, by performing an intersection between the first probabilistic data structure and the second probabilistic data structure.

11. The method of claim 6 wherein the first probabilistic data structure comprises one or more characteristics selected from the group of a bit size of the first probabilistic data structure and one or more hash functions utilized, and further comprising:

returning, by the datastore layer service to the upstream service, information that identifies the one or more characteristics of the first probabilistic data structure.

12. The method of claim 1 wherein the classification information indicates that the data item is one of a driver's license identifier, a social security number, and a credit card number.

13. The method of claim 1 further comprising:

returning, by the datastore layer service to the upstream service, information that identifies the data item that has been classified as a sensitive data item.

14. The method of claim 1 wherein the datastore layer service comprises a first container, the sensitive data classifier comprises a second container, and the first container and the second container execute in a same pod.

15. A computing system comprising:

one or more processor devices of one or more computing devices, wherein the one or more processor devices are configured to:

receive, by a datastore layer service of a plurality of services that compose an application from an upstream service of the plurality of services, a request, the request being associated with a transaction submitted to the application, the request including a transaction identifier that uniquely identifies the transaction;

initiate, by the datastore layer service in response to the request, a query against a datastore to obtain a data item based on information included in the request;

analyze, by a sensitive data classifier, query information associated with the query;

determine, by the sensitive data classifier, that the query requests a data item that has been classified as a sensitive data item; and in response to the determination that the query requests the data item that has been classified as a sensitive data item, cause, by the sensitive data classifier, the transaction identifier and classification information that indicates the query requested the data item that has been classified as a sensitive data item to be sent to a collector service, wherein the collector service receives the transaction identifier and the classification information, and stores the classification information in a datastore based on the transaction identifier, wherein the classification information is correlated with the transaction identifier and a security token in the datastore, the security token comprising an identity of an entity, associated with the transaction, that identifies and authorizes a transaction originator of the transaction prior to processing the transaction.

16. The computing system of claim 15 wherein the query information associated with the query comprises the query, and wherein the one or more processor devices are further configured to:

determine, by the sensitive data classifier, that a data catalog that classifies data fields of the datastore exists; and determine, by the sensitive data classifier, based on the query and the data catalog, that the data item requested by the query is maintained in a data field that has been identified as a sensitive data field.

17. The computing system of claim 15 wherein the query information associated with the query comprises the data item obtained from the datastore, and wherein the one or more processor devices are further configured to:

process the data item with at least one regular expression; and determine, based on processing the data item with the at least one regular expression, to classify the data item as a sensitive data item.

18. The computing system of claim 15 wherein the query information associated with the query comprises a plurality of data items obtained from the datastore, and wherein the one or more processor devices are further configured to:

determine, by the sensitive data classifier, that the plurality of data items has been classified as a plurality of sensitive data items;

store the plurality of data items in a first probabilistic data structure; and send, by the sensitive data classifier to the collector service, the first probabilistic data structure.

19. A non-transitory computer-readable storage medium that includes executable instructions configured to cause one or more processor devices to:

receive, by a datastore layer service of a plurality of services that compose an application from an upstream service of the plurality of services, a request, the request being associated with a transaction submitted to the application, the request including a transaction identifier that uniquely identifies the transaction;

initiate, by the datastore layer service in response to the request, a query against a datastore to obtain a data item based on information included in the request;

analyze, by a sensitive data classifier, query information associated with the query;

determine, by the sensitive data classifier, that the query requests a data item that has been classified as a sensitive data item; and in response to the determination that the query requests the data item that has been classified as a sensitive data item, cause, by the sensitive data classifier, the transaction identifier and classification information that indicates the query requested the data item that has been classified as a sensitive data item to be sent to a collector service, wherein the collector service receives the transaction identifier and the classification information, and stores the classification information in a datastore based on the transaction identifier, wherein the classification information is correlated with the transaction identifier and a security token in the datastore, the security token comprising an identity of an entity, associated with the transaction, that identifies and authorizes a transaction originator of the transaction prior to processing the transaction.

20. The non-transitory computer-readable storage medium of claim 19 wherein the query information associated with the query comprises the query, and wherein the instructions are further configured to cause the one or more processor devices to:

determine, by the sensitive data classifier, that a data catalog that classifies data fields of the datastore exists; and determine, by the sensitive data classifier, based on the query and the data catalog, that the data item requested by the query is maintained in a data field that has been identified as a sensitive data field.

21. The non-transitory computer-readable storage medium of claim 19 wherein the query information associated with the query comprises the data item obtained from the datastore, and wherein the instructions are further configured to cause the one or more processor devices to:

process the data item with at least one regular expression; and determine, based on processing the data item with the at least one regular expression, to classify the data item as a sensitive data item.

* * * * *